US011682959B2

(12) United States Patent
Chiolerio

(10) Patent No.: US 11,682,959 B2
(45) Date of Patent: Jun. 20, 2023

(54) THERMOMAGNETIC APPARATUS FOR ELECTRIC POWER GENERATION AND METHOD THEREOF

(71) Applicant: FONDAZIONE ISTITUTO ITALIANO DI TECNOLOGIA, Genoa (IT)

(72) Inventor: Alessandro Chiolerio, Turin (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 260 days.

(21) Appl. No.: 17/290,607

(22) PCT Filed: Nov. 6, 2019

(86) PCT No.: PCT/IB2019/059528
§ 371 (c)(1),
(2) Date: Apr. 30, 2021

(87) PCT Pub. No.: WO2020/095222
PCT Pub. Date: May 14, 2020

(65) Prior Publication Data
US 2021/0399618 A1     Dec. 23, 2021

(30) Foreign Application Priority Data

Nov. 7, 2018  (IT) .................. 102018000010096

(51) Int. Cl.
*H02K 44/26*    (2006.01)
*H02K 44/12*    (2006.01)
(Continued)

(52) U.S. Cl.
CPC ............... *H02K 44/26* (2013.01); *H02K 1/17* (2013.01); *H02K 3/22* (2013.01); *H02K 5/22* (2013.01);
(Continued)

(58) Field of Classification Search
CPC ........ H02K 44/00; H02K 44/08; H02K 44/18; H02K 44/26; H05H 1/04; H05H 1/10; H01L 23/473; H02N 10/00; H02N 11/002
(Continued)

(56) References Cited

U.S. PATENT DOCUMENTS

| 396,121 A | 1/1889 | Tesla |
| 5,864,466 A * | 1/1999 | Remsburg ........... F28D 15/0266 165/80.4 |

(Continued)

FOREIGN PATENT DOCUMENTS

| FR | 2 407 599 A1 | 5/1979 |
| WO | 2008/010202 A2 | 1/2008 |

OTHER PUBLICATIONS

International Search Report and Written Opinion issued for PCT/IB2019/059528 datde Feb. 7, 2020, 13 pages.
(Continued)

*Primary Examiner* — Burton S Mullins
(74) *Attorney, Agent, or Firm* — Rothwell, Figg, Ernst & Manbeck, P.C.

(57) ABSTRACT

A thermomagnetic apparatus for electric power production, comprising: a hollow toric vessel (30) delimited by a wall (31) having an outer toric surface (31a) having a toroidal direction, wherein the toric wall (31) encloses a volume containing a ferrofluid which comprises magnetic nanoparticles dispersed or suspended in a fluid carrier; a plurality of hydraulic conduits (36-39) in thermal contact with the outer toric surface (31a); a magnetic field source (62) coupled to the outer toric surface (62) and an extraction coil (65) which comprises a plurality of turns (65') of electrical conductor wire arranged on the outer toric surface (31a).

14 Claims, 3 Drawing Sheets

(51) Int. Cl.
  *H02K 44/16* (2006.01)
  *H02N 10/00* (2006.01)
  *H02K 1/17* (2006.01)
  *H02K 3/22* (2006.01)
  *H02K 5/22* (2006.01)

(52) U.S. Cl.
  CPC ............. *H02K 44/12* (2013.01); *H02K 44/16* (2013.01); *H02N 10/00* (2013.01)

(58) Field of Classification Search
  USPC .......................................................... 310/11
  See application file for complete search history.

(56) References Cited

U.S. PATENT DOCUMENTS

| | | | |
|---|---|---|---|
| 6,725,668 B1 * | 4/2004 | Cornwall | H10N 15/20 322/29 |
| 6,856,037 B2 * | 2/2005 | Yazawa | F03G 7/00 290/43 |
| 6,982,501 B1 | 1/2006 | Kotha et al. | |
| 8,129,882 B2 * | 3/2012 | Russberg | F16K 11/0853 136/211 |
| 2008/0150472 A1 | 6/2008 | Tsai | |
| 2013/0076158 A1 | 3/2013 | Motisse | |
| 2013/0334899 A1 | 12/2013 | Motisse | |

OTHER PUBLICATIONS

Kishore, et al., "A review on design and performance of thermomagnetic devices", Renewable and Sustainable Energy Reviews 81 (2018) 33-44.

Bibo, et al., "Electromagnetic ferrofluid-based energy harvester", Physics Letters A 376 (2012) 2163-2166.

* cited by examiner

THERMOMAGNETIC APPARATUS FOR ELECTRIC POWER GENERATION AND METHOD THEREOF

CROSS REFERENCE TO RELATED APPLICATION(S)

This application is a 35 U.S.C. 371 National Phase Entry Application from PCT/IB2019/059528, filed Nov. 6, 2018, which claims priority to Italian Application No. 102018000010096, filed Nov. 7, 2018. The entirety of the disclosure of the above-referenced applications are incorporated herein by reference.

The present invention relates to a method and an apparatus for converting thermal energy into electric power.

In industrial processes, such as metal melting furnaces, cement synthesis, furnaces for glass production, refineries, etc., large amounts of thermal energy are dispersed. The processes for converting thermal energy are often characterized by the passage of energy from the thermal form to the mechanical form and from the latter to electricity. However, this step is considered economical for enthalpy leaps of high amplitude, while for low enthalpy fluids it is preferred to dispose of excess heat in the environment.

A different approach is offered by thermomagnetic machines, which are based on the effects induced by heat on the magnetic properties of ferromagnetic, ferrimagnetic or antiferromagnetic materials. Ferromagnetic materials undergo a sudden phase transition near the transition temperature. The transition temperature, or Curie temperature or Curie point is that temperature value in which the permanent magnetisation disappears and the material turns paramagnetic. A first example of a thermomagnetic machine is described in U.S. Pat. No. 396,121 by Nikola Tesla. Rapid changes in the magnetisation state can be used to convert thermal energy directly or indirectly (through mechanical energy) into electricity.

R. A. Kishore and S. Priya in "*A review on design and performance of thermomagnetic devices*", published in Renewable and Sustainable Energy Reviews, vol. 81, January 2018, pages 33-44, report some studies on technologies for harvesting thermomechanical energy.

In recent years, current generators that use alternating and moving magnetic fields rather than the heating and cooling of ferromagnetic fluids have been studied.

WO 2008/010202 describes a closed-loop energy converter for converting thermal energy into alternating current electrical energy. The converter comprises a container for absorbing energy from an external heat source, a container for dissipating energy surrounded by a heat sink, an inlet conduit and an outlet conduit between the two containers so as to form a closed loop, elements for generating a magnetic field around sections of conduits and conductive wires wound around sections of conductors in which an alternating current is induced. When the ferromagnetic mixture is transported along the conduits, the magnetic fields have sufficient intensity so as to induce magnetic dipoles in the magnetic particles to form "bullets" which comprise discrete groups of magnetic particles of the magnetic fluid.

US 2013/0076158 relates to an electric power generator which comprises a conduit wound around a magnetic core, a heat source, a heat sink and a ferromagnetic particle fluid inside the conduit to produce a magnetic flux.

Magnetic fluids are generally classified as "ferrofluids" if they are colloidal suspensions composed of magnetic particles of nanometric-scale size (typically about 10 nm) suspended in a liquid carrier, usually water or an organic solvent. The particles of the colloidal suspension will be indicated below with nanoparticles. The use of capping agents is also frequent, that is molecular coatings characterized by a certain spatial volume, which are bound to the nanoparticles and ensure that said nanoparticles, in the resting state, cannot attract one another due to the magnetostatic force and agglomerate to form an aggregate that is too heavy to float in the solvent (precipitate).

A fundamental property of ferrofluids is that, in the presence of a non-homogeneous magnetic field, they are attracted to a region with greater field intensity.

Since the magnetic particles of a ferrofluid are usually of the order of 10 nm, the interest has also been directed to the micro- and nano-electromechanical systems (MEMS and NEMS). U.S. Pat. No. 6,982,501 concerns a current generator, in which a pump pushes a magnetic fluid from a reservoir into a ring made from a non-conductive and non-magnetic tube. An alternating and moving magnetic field let the fluid circulate along the ring reducing the effective viscosity of the fluid and inducing rotations in the magnetic particles suspended in the magnetic fluid. The rotations induce a magnetic flux that varies over time and consequently an electric current through externally wound harvesting coils. A direct current electromagnet ensures a positive magnetomotive force.

2006/0110260 describes an energy generator with a micro vortex generator for a ferrofluid.

The use of ferrofluids for harvesting vibrational energy has been studied in "*Electromagnetic ferrofluid-based energy harvester*", by A. Bibo et al., published in Physics Letters A 376 (2012), 2163-2166. An electromagnetic micro-energy generator uses the sloshing of a cylindrical ferrofluid column in a tank excited with mechanical vibrations to transform the mechanical motion directly into electricity. The ferrofluid was subjected to an external magnetic field to generate a net magnetic moment in the fluid particles and the mechanical excitation was at a frequency corresponding to one of the infinite frequency modes of the fluid in the column (resonance conditions). The authors conclude that, although the energy levels obtained are modest, the solution may be advantageous if it is not possible to use a moving solid magnet.

As is generally known, the processes of the thermally induced ferrofluid transport are characterized by the size of the nanoparticles, the particle size distribution, their concentration and dynamic viscosity, their chemical nature and that of the liquid carrier in which they are dispersed.

A phenomenon that affects ferrofluids is the thermal diffusion that takes place in the presence, in a finite volume, of a thermal gradient that creates a concentration gradient in the magnetic ferrofluid particles. The intensity and direction of transport is represented by the Soret coefficient. A positive coefficient moves the particles towards a colder region of the volume (thermophobia), while a negative coefficient moves the particles towards a warmer region (thermophilia). The thermomagnetic diffusion, or thermal advection is added to this effect, which diffusion consists in a whirling motion whose axis of rotation is established perpendicularly with respect to the thermal gradient, collinear with the magnetic field.

SUMMARY

The Applicant has turned his attention to an energy generator which, by producing a thermal gradient in a ferrofluid contained in a volume and applying a magnetic field thereon, is able to produce electromagnetic energy that can be harvested as electric power. In particular, he has observed that it would be advantageous to design a thermomagnetic machine that uses heat, in particular waste heat, and whose manufacturing and installation costs are such as to allow large-scale production. Waste heat can come from heat recovery from energy-intensive industrial processes, usually at temperatures below 250° C., such as steam for cooling industrial processes, or processes that occur in autonomous systems such as exhaust gases from internal combustion engines (above this temperature it is usual to proceed with cogeneration). The so-called renewable energy sources, such as low-enthalpy geothermal, photovoltaics for cooling the modules, possibly also wind power for the cooling operations of the rotating components, as well as the radiant heat provided by the human bodies, are also possible for the supply of thermal waste, if compared to the temperature of the external environment and able to generate an enthalpy leap. In the latter case, the use of thermomagnetic systems of particularly small size (MEMS) is required.

The creation of a thermal gradient in a finite volume containing a ferrofluid and enclosed by a surface induces a variation in the density of the ferrofluid adjacent to this surface and therefore generates a density (or concentration) gradient in the ferrofluid. The Applicant has observed that when a variable density gradient is created in a ferrofluid contained in a vessel by means of a succession of thermal gradients produced on the wall of the vessel and a magnetic field parallel to the thermal gradient vector is applied, a curved geometry of the vessel creates a circular trajectory of the flow of magnetic nanoparticles, namely of the density gradient. The Applicant has understood that a toroidal geometry of the vessel allows a minimisation of the deformations of the flow lines of the ferrofluid nanoparticles, which are often due to abrupt variations in the shape of the vessel.

The Applicant has considered a toric vessel and a subdivision of the outer surface of the vessel into alternated adjacent regions at a relatively higher temperature and at a relatively lower temperature, so as to create a thermal gradient along a respective thermal gradient line in each pair of adjacent regions. In particular, the Applicant has understood that the creation of a succession of thermal gradient lines around the outer surface of the toric vessel and the application of an external magnetic field parallel to the thermal gradient on the same surface create a net flow of circular magnetic moment, along the toroidal direction of the vessel, and in some conditions the stabilisation thereof over time in a shape that combines the toroidal component with the transverse and preferably poloidal component, thus ensuring a continuous, helical movement around the toroid axis itself.

In preferred embodiments of the present invention, the succession of thermal gradient lines around the outer surface of the toroidal shaped vessel is achieved by a plurality of thermal transfer elements arranged on the outer surface of the toroidal vessel in a direction transverse to the diameter of the vessel, wherein near adjacent thermal transfer elements adjacent on the outer surface are at respective different temperatures. In preferred embodiments, the heat transfer elements are hydraulic conduits. The plurality of hydraulic conduits act as thermal transfer elements for heating or cooling surface zones of the toric wall so as to heat or cool the flow of nanoparticles locally.

In accordance with the present disclosure, a method is described for harvesting electric power using thermomagnetic energy which comprises:

providing a hollow toric vessel delimited by a wall having an outer toric surface having a toroidal direction, wherein the toric wall encloses a volume containing a ferrofluid which comprises magnetic nanoparticles dispersed or suspended in a fluid carrier;

generating a plurality of temperature gradients along the toroidal direction creating a plurality of surface zones extending on the outer toric surface transversely to the toroidal direction and alternated between a relatively higher temperature and a relatively lower temperature, so as to create a difference in temperature in each pair of near adjacent surface zones, each temperature gradient of the plurality of gradients being represented by a vector tangent to the outer toric surface of scalar value equal to the temperature difference; likewise, due to the construction geometry of the container and the conduits, the gradient may be represented by the difference in temperature between diametrically opposite zones facing the toric surface;

generating a magnetic flux on the outer toric surface and having a vector direction tangent to the same surface, and harvesting electric current from an extraction coil, the extraction coil comprising a plurality of turns of conductive electric wire, the turns being arranged on the outer toric surface.

Preferably, the fluid carrier of the ferrofluid in which the magnetic nanoparticles are suspended or dispersed is a liquid carrier.

Preferably, generating a plurality of temperature gradients along the toroidal direction comprises:

placing the plurality of surface zones in thermal contact with respective heat transfer elements which are alternately at a relatively higher temperature and at a relatively lower temperature.

The method preferably further comprises controlling the temperature of each heat transfer element by cyclically varying over time the temperature of each heat transfer element between the relatively higher temperature and the relatively lower temperature so that at each temperature variation, the scalar value of the temperature gradient between near adjacent surface zones is reversed in sign.

In the present description and following claims, with a direction or line transverse to the toroidal direction of the toroidal vessel (generally corresponding to the diameter of the vessel) it is preferably intended that the direction or transverse line forms an angle with the toroidal direction comprised between 50° and 140°, more preferably between 70° and 110°. In a particularly preferred embodiment, the transverse direction (or line) forms an angle of 90° with the toroidal direction. In a vessel with a toric surface, the transverse directions arranged at 90° with respect to the toroidal direction are the poloidal directions, by definition perpendicular to the toroidal direction.

Preferably, the surface zones extended on the outer toric surface alternating between a relatively higher temperature and a relatively lower temperature are extended along transverse directions that are parallel to each other, preferably along poloidal directions.

The present invention also concerns a thermomagnetic apparatus for the electric power production which comprises:

a hollow toric vessel delimited by a wall having an outer toric surface having a toroidal direction, wherein the toric wall encloses a volume containing a ferrofluid which comprises magnetic nanoparticles dispersed or suspended in a fluid carrier;

a plurality of hydraulic conduits in thermal contact with the outer toric surface and arranged thereon along directions transverse to the toroidal direction, wherein near adjacent hydraulic conduits are spaced from each other in the toroidal direction so as to define on the outer toric surface a respective plurality of intermediate surface zones extending transversely to the toroidal direction;

a magnetic field source coupled to the outer toric surface to generate a magnetic flux thereon, and an extraction coil which comprises a plurality of turns of electrical conductor wire arranged on the outer toric surface, the turns of the extraction coil being wound along directions transverse to the toroidal direction and arranged at at least a first sub-plurality of the plurality of intermediate surface zones.

Preferably, each conduit of the plurality of conduits is wound around the outer surface with at least one conduit winding extending along a respective direction transverse to the toroidal direction. Preferably, the transverse directions of the windings are generically parallel to each other and the respective conduit windings of the plurality of conduits are arranged adjacent in an alternating fashion with respect to one another so that conduit windings that are mutually near adjacent are windings of two different conduits of the plurality of conduits. The intermediate surface zones are delimited by near adjacent conduit windings.

Preferably, the toric wall of the vessel is made of a rigid material, that is, which is not subject to significant deformations during the ordinary operation thereof in the apparatus.

Preferably, the toric wall of the vessel is made of a diamagnetic material. Preferably, the material that forms the toric wall is thermally conductive so as to allow a transfer of thermal energy from the thermal transfer elements to the ferrofluid that flows inside the vessel, as described in more detail below. Preferably, the toric wall is made of a material with a thermal conductivity greater than 10 W/mK.

Preferably, the toric wall of the vessel is made of a material with electrical conductivity of less than 1 mS/cm or electrically insulating.

The toric wall of the vessel can may have a thickness of less than 5 mm, preferably between 1 mm and 4 mm.

Preferably, the plurality of turns of electrical conductor wire of the extraction coil are arranged at each of the plurality of intermediate surface zones.

Preferably, the magnetic field source is configured to create an external magnetic field having a direction tangent to the outer toric surface.

Preferably, the magnetic field source comprises a plurality of permanent magnets arranged on the outer toric surface at at least a second sub-plurality of intermediate surface zones. More preferably, the magnets are arranged on each of the intermediate surface zones.

In the embodiment in which the magnetic field source comprises a plurality of permanent magnets, each magnet of the plurality is configured to create an external magnetic field having a direction tangent to the outer toric surface. Each magnet of the plurality of magnets can be arranged in contact with the outer toric surface. For example, the magnets of the plurality can be plate magnets mounted on the outer toric surface.

The plurality of permanent magnets may be subdivided into sub-pluralities of magnets, each sub-plurality being arranged on a respective intermediate surface zone. Preferably, a sub-plurality of magnets of the plurality of magnets is arranged on each of the second sub-plurality of intermediate surface zones, each sub-plurality of magnets being arranged on the respective intermediate surface zone along a direction transverse to the toroidal direction and generally parallel to the transverse directions of arrangement of the hydraulic conduits.

Preferably, the hydraulic conduits of the plurality are flexible tubes so that they can be arranged along a curved surface such as the toric surface and in particular wound around the toric surface.

Preferably, the diameter of the conduits is comprised between ⅕ and 1/10 of the maximum outer diameter of the vessel, namely taken along the toroidal line.

The hydraulic conduits are preferably made of a material with good thermal conductivity so as to achieve a thermal transfer between the working fluid flowing therein and the toric wall of the vessel. Preferably, the hydraulic conduits are made of a material with thermal conductivity greater than 10 W/mK, more preferably greater than 20 W/mK.

The Applicant has observed that a toric geometry of the vessel allows the poloidal expansion (that is the contraction along the longitudinal axis of said conduit and the expansion along the radial plane) of a hydraulic conduit that creates a closed circuit. An advantage obtained with respect to a closed circuit which follows generally complex paths with respect to the windings around the toric surface along poloidal directions is represented by the constructional compactness (greater energy density per volume and per mass), by the saving of materials, and by the lower losses of load compared to a longer path.

In particular, the Applicant has noted that a suitable variation over time in the sign of the temperature gradients induces a net movement of the ferrofluid nanoparticles along the toroidal direction and leads to the generation of density waves of nanoparticle aggregates that are stable over time.

Without wishing to be bound by a particular theory or explanation, the movement of the ferrofluid nanoparticles may be represented by density (or concentration) waves that propagate inside the vessel along the thermal gradient lines due to the Ludwig-Soret effect and the thermal advection effect. The thermal gradient may be represented by a vector field $\vec{\nabla T}$ whose direction is tangential to the toric surface and therefore like it, it is screwed along the toroidal and poloidal axes. The density gradient, the sign of which with respect to the field $\vec{\nabla T}$ depends on the chemical nature of the nanoparticles and the liquid carrier in which they are suspended or dispersed, in turn creates a variation in the "internal" magnetic field, that is also present when the external magnetic field H=0, which acts as a driving force for convection. The application of an external magnetic field H≠0, parallel to the thermal gradient, induces an aggregation of the nanoparticles in condensates ("clusters") from the movement of which it is possible to extract electromagnetic energy.

The alternation between surface zones at distinct temperatures creates a temperature gradient, the vector of which is tangent to the outer toric surface.

In a reference system integral with the toric vessel, the thermal gradient varies spatially over time, crossing the succession of the surface zones at different temperatures. In a reference system integral with the ferrofluid in a determined position within the volume enclosed by the toric surface of the vessel, the thermal gradient moves over time along the toroidal line of the vessel due to the sign inversion effect of the thermal gradient.

In an operating condition of the thermomagnetic apparatus, each conduit of the plurality of conduits contains a working fluid at a given temperature. The plurality of conduits may consist of an even number N of hydraulic conduits formed by N/2 odd conduits and by N/2 even conduits, the conduit windings of the odd conduits and of the even conduits being arranged alternating one to another, wherein each of the N/2 odd conduits contains a working fluid at a relatively lower temperature and each of the N/2 even conduits contains a working fluid at a relatively higher temperature, creating on the outer surface along the toroidal direction a plurality of surface zones alternating between the relatively lower temperature, at the windings of the N/2 odd conduits, and the relatively higher temperature, at the windings of the N/2 even conduits, said zones alternating along the toroidal direction, so as to create a plurality of temperature gradients at the respective intermediate surface zones.

The apparatus in accordance with the present disclosure may comprise a thermal gradient generator assembly configured to control the temperature of the working fluid contained in each conduit of the plurality of conduits by varying cyclically over time the temperature of the working fluid of said conduit between the relatively higher temperature and the relatively lower temperature and vice versa.

Although the description of the preferred embodiments refers mainly to a thermal gradient of constant scalar value between two distinct temperatures, the present invention contemplates the creation of a thermal gradient between more than two distinct temperatures.

In the present description and claims, "near adjacent" referring to the thermal transfer elements and in particular to the hydraulic conduits for heating/cooling the outer toric surface means that between the two thermal transfer elements, along the toroidal direction (or along the diameter) there is no intermediate element.

An apparatus in accordance with the present disclosure is scalable so that it can be used for applications ranging from wearable devices, to energy recovery for motor vehicles, and to the industrial apparatus.

BRIEF DESCRIPTION OF THE FIGURES

Further characteristics and advantages of the present invention will appear more clearly from the following detailed description of a preferred embodiment thereof, made purely for exemplary, non-limiting purposes, with reference to the appended drawings. In such drawings.

DETAILED DESCRIPTION

Figure 1:
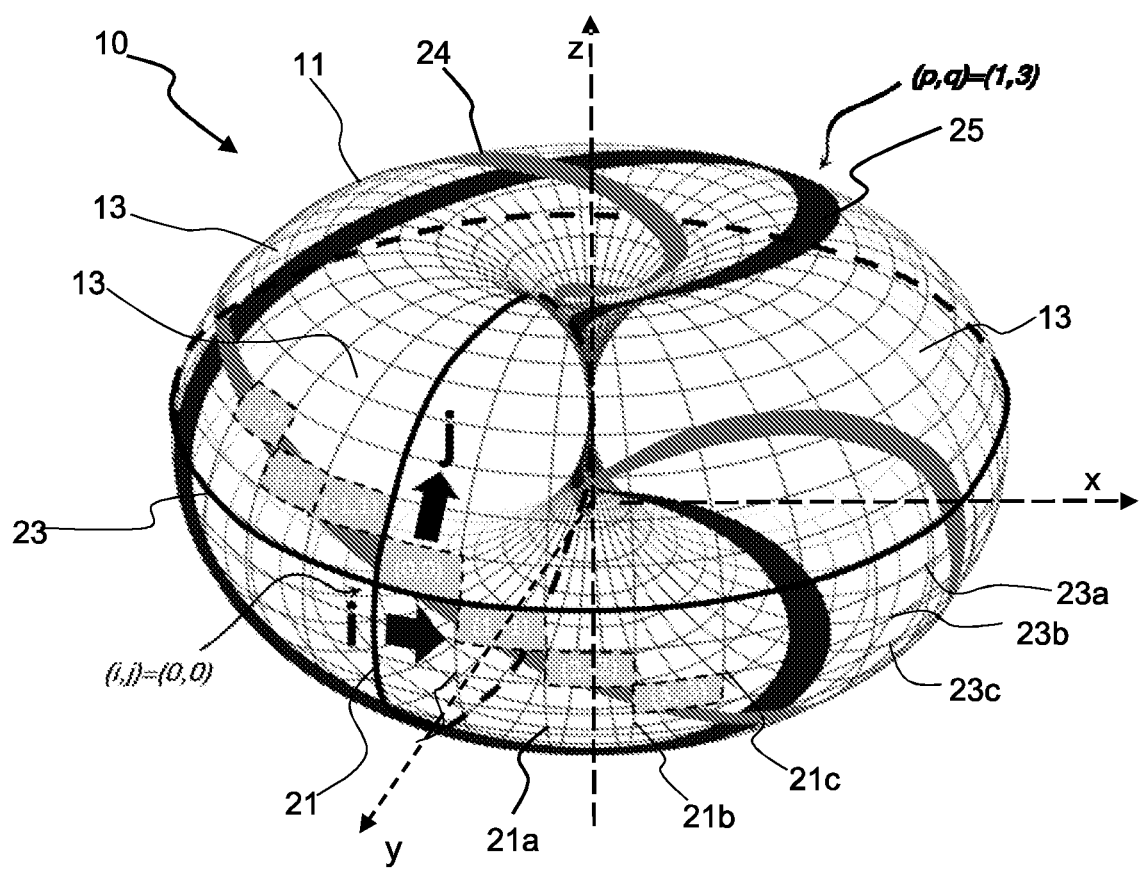
FIG. 1 is a conceptual representation of a toroidal shaped vessel for use in an apparatus in accordance with the present invention.

FIG. 1 is a conceptual representation of a toroidal vessel, in other words a solid torus, suitable for use in an apparatus in accordance with the present invention. A rigid and hollow toroidal vessel 10 comprises a wall with a toric surface, indicated in the following as toric wall, which encloses a volume V. The toric wall 11 has an outer surface, which spatially delimits the vessel, and an inner surface. As is generally known, from a geometrical point of view, a toric surface may be obtained as a revolution surface by rotating a non-degenerate conical section, called generatrix, along a conical, non-degenerate directrix. The axis of rotation along the directrix belongs to the same plane as the generatrix and is perpendicular to the directrix. The toric surface may be with constant or variable generatrix. Preferably, the toric surface defined by the wall 11 has a constant circular or elliptical generatrix with a through, preferably central, opening.

In the present invention, the vessel 10 may be a spherical or oblate toroid.

The outer toric surface of the wall 11 may be described geometrically by a poloidal-toroidal coordinate system (i,j), in which the toroidal coordinate i is along the directrix or along lines parallel to the directrix, indicated with toroidal lines that define a toroidal direction, and the poloidal coordinate j is along the lines between the poles of the torus, perpendicular to the toroidal lines and indicated with poloidal lines. The directrix 23 is indicated in FIG. 1, that is the "equatorial" line of the vessel 10 which symmetrically divides the toroidal surface. The origin of the coordinate system (i,j)=(0,0) is taken as an arbitrary intersection point between the directrix 23 and a poloidal line 21, indicated in the following as reference poloidal line.

The outer surface 31a of the toric wall of the vessel 10 may be geometrically subdivided into a plurality of surface zones 13 adjacent to each other which form a tessellation of the outer surface defined by a grid of meridians corresponding to the poloidal lines 21, 21a, 21b, 21c etc. in the poloidal direction, and of parallels corresponding to the toroidal lines 23, 23a, 23b, 23b, etc. in the toroidal direction. Each surface zone 13 has a quadrangular shape and extends along the toroidal and poloidal directions. The surface zones 13 are indicated below with cells. In this conceptual representation, the outer surface of the torus is therefore tessellated, namely subdivided into cells that are adjacent to and in contact with one another. The number of cells can be comprised from 10 to $10^4$, depending, inter alia, on the area of the whole outer surface of the solid torus 10. In the example illustrated in FIG. 1, the spherical toroidal surface is subdivided into toroidal and poloidal segments with angular opening of 10° in both the toroidal and poloidal directions (360°/10°=36 per segment) for a total of cells equal to 1296 ($36^2$). In another example (not illustrated), the subdivision is in toroidal segments with angular opening of 45° and poloidal segments with angular opening of 90° for a total of cells equal to 32 (8×4).

The surface zone of each cell may be comprised between 1×1 $m^2$ and 1000×1000 $mm^2$.

In Cartesian coordinates, a radial axis x in the equatorial plane (x, y) is defined which comprises the directrix 23 and a poloidal axis z, which coincides with the axis of rotation of the torus and is perpendicular to the radial axis x, central with respect to the solid torus.

The hollow toroidal vessel 10 is configured to contain a fluid, in particular a ferrofluid, which fills a volume V delimited by the toric wall 11, in particular by the inner surface of the wall.

Figure 2:
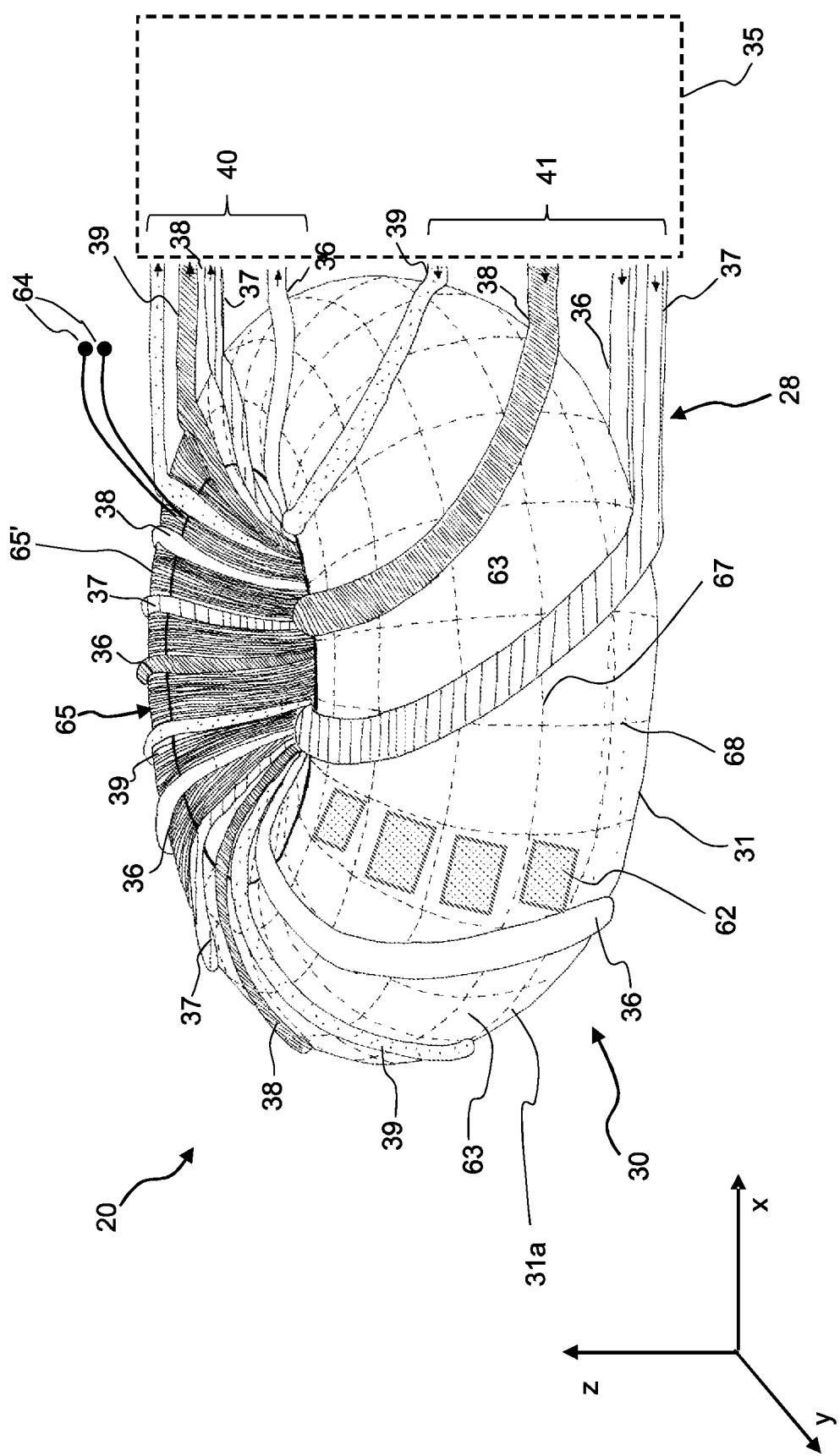
FIG. 2 is a schematic representation of an energy generator apparatus in accordance with a preferred embodiment of the present invention.

FIG. 2 is a schematic representation of a perspective view of a thermomagnetic apparatus for the electric power production, in accordance with an embodiment of the present invention. The thermomagnetic apparatus 20 comprises a rigid and hollow toroidal vessel 30. The vessel 30 comprises a toric wall 31 which has an outer toric surface 31a, which spatially delimits the vessel, and an opposite inner surface (not visible). Preferably, the toric surface defined by the wall 31 has a constant circular or elliptical generatrix. In the embodiment shown in the figures, the toric wall has a generically donut shape with a through opening, preferably central (genus torus 1).

On the toric surface 31*a* a toroidal direction 67 is defined, along the maximum diameter of the surface itself. From the geometrical point of view, the toroidal direction 67 corresponds to the directrix of the solid torus formed by the vessel 30.

Preferably, the hollow vessel 30, that is the toric surface wall 31 is made of a diamagnetic material with relative magnetic permeability lower than the unit so as not to interfere significantly with an external magnetic field applied to its surface and/or with flow of the magnetic nanoparticles of the ferrofluid, as described in more detail below.

Preferably, the material of the toric wall 31 has a low electrical conductivity, preferably lower than about 1 mS/cm, or electrically insulating.

The toric wall 31 is made of a thermally conductive and diamagnetic material. Preferably, the toric wall is of a material with high thermal conductivity, preferably higher than 10 W/mK, more preferably higher than 20 W/mK, so as to facilitate the transfer of heat from the outside to the inside of the vessel and from the inside to the outside thereof.

Preferably, the thickness of the wall 31 is less than 5 mm, more preferably comprised between 1 mm and 4 mm.

In some embodiments, the vessel is made of a polymeric material such as polyamide (PA) or acrylonitrile butadiene styrene (ABS).

The vessel may be produced by known techniques such as the stereolithographic technology or molten filament modelling for 3D printing of an object.

Preferably, the inner surface (not visible) of the wall 31 of the vessel 30 has a reduced roughness so as to have a reduction of possible frictions between the surface and the ferrofluid and therefore a better sliding of the same.

In some embodiments, the inner surface of the wall is coated with a polymer with low surface roughness and high thermal conductivity, such as for example PTFE, preferably, carbon-filled PTFE with a percentage weight comprised between 10% and 35%.

A ferrofluid is contained inside the hollow vessel 30 (not visible in the figure), that is a stable colloidal dispersion of nanoparticles in a fluid, i.e. the liquid carrier, in which the nanoparticles have a non-null and typically high magnetic moment. Preferably, the nanoparticles have a minimum saturation value of 10 mT and preferably of 100 mT. For example, the ferrofluid is composed of a liquid solvent in which nanoparticles of a compound containing $Fe^{2+}$ or $Fe^{3+}$ or a combination of the two oxidation states are suspended or dispersed. The choice of the liquid carrier depends at least in part on the application and in particular on the working temperature of the apparatus. For example, if the working temperatures are lower than 100° C., the liquid carrier may be selected from the group consisting of water, ethanol, cyclohexane, petrol and acetone. For higher working temperatures, the liquid solvent may be a fluorinated oil or an ionic liquid.

In some particularly preferred embodiments, the liquid carrier of the ferrofluid contained in the vessel 30 has a low viscosity, preferably lower than 100 mPa·s.

Nanoparticles that are suspended or dispersed in the liquid carrier may be ferromagnetic, ferrimagnetic, super-paramagnetic or multiferroic nanoparticles. Preferably, the nanoparticles have a size distribution between 1 nm and 50 nm in diameter. The nanoparticles may be monodispersed or polydispersed in the liquid carrier. The nanoparticles can have a spherical or ellipsoidal shape and are made for example of iron, magnetite, maghemite, barium ferrite, cobalt, nickel, gold-platinum, neodymium-iron-boron or samarium-cobalt.

In some preferred embodiments, the nanoparticles are ferrimagnetic with non-compensated spin, which is typical of metal oxides, which in general are chemically more stable than pure metals or metal alloys.

The apparatus 20 comprises a plurality of thermal transfer elements in thermal contact with the outer surface 31*a* of the toric wall 31, indicated as a whole with the reference number 28, and a thermal gradient generator assembly 35 configured to generate a thermal gradient on the toric wall 31. The thermal gradient generator assembly 35 is indicated schematically with a dashed box in FIG. 2 and described with reference to FIG. 3. The thermal transfer elements are configured and arranged so as to create a thermal gradient which extends along directions transverse to the toroidal direction 67 of the vessel so as to induce a flow of ferrofluid nanoparticles along the toroidal direction 67. Preferably, the thermal gradient extends along poloidal directions of the toric wall 31, generally perpendicular to the toroidal direction 67.

Figure 3:
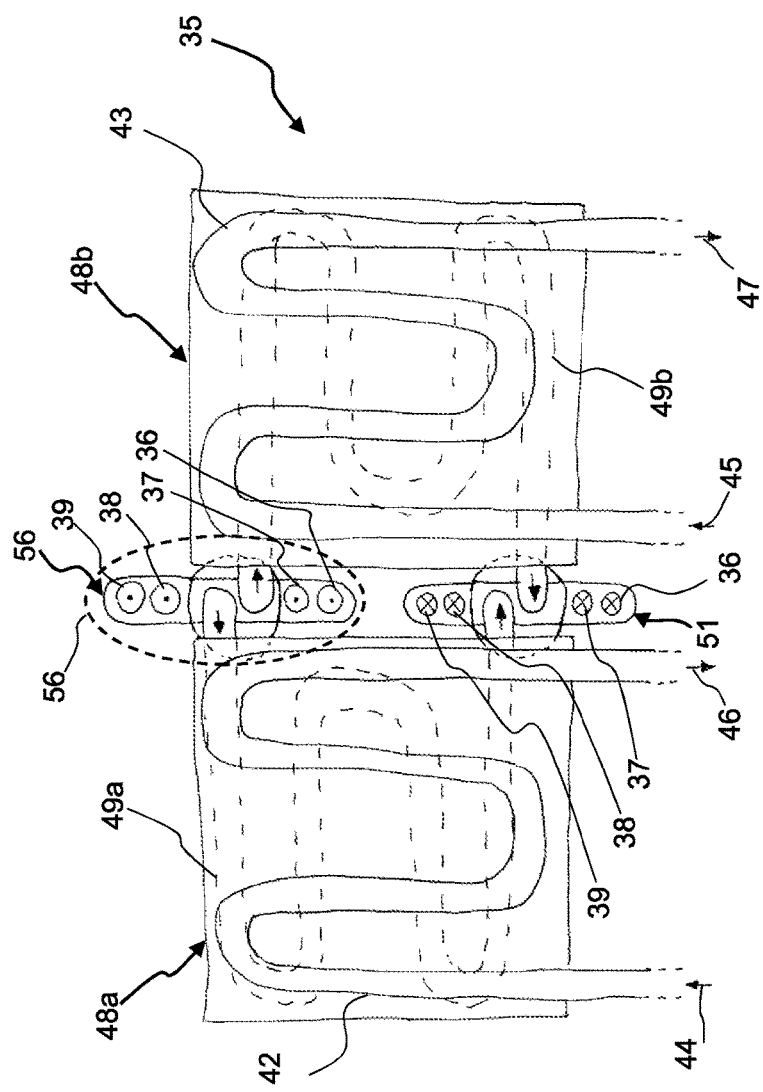
FIG. 3 is a schematic diagram seen from above of an embodiment of a hydraulic circuit for controlling the temperature of the working fluid of the apparatus of FIG. 2, part of the thermal gradient generator assembly.

In the embodiment shown in FIGS. 2 and 3, the plurality of thermal transfer elements 28 is a plurality of N hydraulic conduits 36, 37, 38 and 39 wound on the outer surface 31*a* of the wall 31 of the toric vessel 30. Each conduit 36, 37, 38, 39 is wound around the outer surface 31*a* with at least one conduit winding and the windings of the respective conduits are arranged adjacent to one another on the outer surface so as to be mutually spaced apart in the toroidal direction 67.

The conduit windings partially cover the outer toric surface 31*a* of the wall 31 of the vessel 30, leaving a plurality of intermediate surface zones 63 arranged between each pair of adjacent conduit windings "free", in particular not covered by the conduit windings. The intermediate surface zones 63 are delimited by near adjacent conduit windings.

Preferably, the hydraulic conduits of the plurality are flexible tubes so that they can be arranged along a curved surface such as the toric surface 31*a* and in particular so that they can be wound around this surface.

Each conduit 36, 37 38, 39 of the plurality is wound around the outer surface 31*a* with a number k of windings, with k≥1.

Preferably, each conduit of the plurality is wound around the outer surface 31*a* with a plurality k of conduit windings, with k≥2, wherein the windings extend along directions transverse with respect to the toroidal direction 67 of the vessel and are arranged with respect to one another laterally around the outer surface 31*a* so as to be spaced from one another in the toroidal direction. The conduit windings of the plurality of conduits are arranged adjacent in an alternate fashion with respect to one another so that, for each pair of mutually adjacent conduit windings, the windings of the pair are windings of two different conductors of the plurality. In particular, a j-th winding (j=1, . . . , k) of an i-th conduit (i=1, . . . , N), for example 36, is arranged adjacent to a winding j of a (i+1)-th conduit of the N plurality, for example 37, on one side and a winding j of a (i−1)-th conduit on the opposite side, with respect to the toroidal direction. The sequence of the conduit windings for the conduits i=1, . . . , N is repeated k times, if k>1.

The number N of conduits of the plurality is an even number greater than or equal to 2, the number depending on the size of the vessel, in particular the maximum diameter thereof, and the number of alternating zones at cold and warm temperature that it is desired to generate on the toric wall 31. In the embodiment shown in FIG. 2, the plurality of conduits is composed of N=4 conduits, a first conduit 36, a second conduit 37, a third conduit 38 and a fourth conduit 39. In the embodiment of FIG. 2, the number of windings k is equal to 4. Such a configuration may be obtained by simultaneously winding the four conduits 36, 37, 38, 39, spaced laterally apart from one another, around the toric surface 31a.

In the embodiment shown schematically in FIG. 2, the conduit windings are arranged along transverse directions which are generally parallel one to another.

Preferably, the hydraulic conduits 36, 37, 38, 39 are wound along poloidal lines 68 of the toric surface 31a and in such a way that the conduit windings are generally parallel one to another, for example forming an angle of preferably 45° with the toroidal axis z.

In an operating condition of the thermomagnetic apparatus 20, the conduits of the plurality 36, 37, 38, 39 are filled with a working fluid at a given temperature and in two conduits with conduit windings that are near adjacent to one another on the toric surface a working fluid flows at two distinct temperatures: a first relatively higher temperature, $T_2$, and a second relatively lower temperature, $T_1$, with $T_2 > T_1$ and temperature difference $\Delta T = (T_2 - T_1)$. Being the conduits in thermal contact with the outer surface 31a of the toric wall 31, a temperature difference $\Delta T = (T_2 - T_1)$ is created between a surface zone in thermal contact with the conduit that contains the working fluid at temperature $T_1$ and a surface zone in thermal contact with the conduit that contains the working fluid at temperature $T_2$, at the intermediate surface regions 63.

The temperature $T_1$ will be indicated in the present description and the following claims with "first temperature", while the temperature $T_2$ will be indicated with "second temperature". "Relatively higher temperature" and "relatively lower temperature" means that a temperature is higher/lower relative to the other temperature.

In the embodiment shown in FIGS. 2-3, the thermal contact between the hydraulic conduits 36-39 of the plurality of conduits is a direct contact between the outer surface of the conduits and the outer surface 31a of the toroidal wall 31. However, the thermal contact between conduit and toric surface may not be a direct (physical) contact, provided that it guarantees an adequate thermal transfer to the toric wall.

The plurality of N conduits (N being an even number) may be subdivided into a sub-plurality N/2 of even conduits and a sub-plurality N/2 of odd conduits, the even and odd conduits being arranged on the surface 31a alternatively one with respect to the others. For example, in the case where N=2, the plurality of conduits consists of an even conduit and an odd conduit. In particular, the windings of the even conduits and those of the odd conduits are arranged on the surface 31a alternately one to another. The plurality of conduit windings arranged along the diameter of the toroidal vessel 30 creates, on the outer surface 31a of the toric wall 31, a succession of adjacent alternating regions at a relatively higher temperature, $T_2$, and at a relatively lower temperature, $T_1$, so as to create a temperature difference $\Delta T = (T_2 - T_1)$ and then a thermal gradient in each pair of adjacent regions along a direction transverse to the diameter of the toric vessel 30.

The surface zones of the outer toric surface 31a at the conduit windings at temperatures $T_1$ and $T_2$ are also indicated below with surface cooling zones and surface heating zones.

A thermal gradient line is defined as an ideal boundary line between a surface zone at temperature $T_1$ (cooling zone) and a surface zone at temperature $T_2$ (heating zone) of the toric wall, that is a line representing the temperature difference $\Delta T$. It is to be understood that, in many practical implementations, the thermal gradient line is comprised in a transition region which extends parallel to the conduits, in which the temperature is comprised between $T_1$ and $T_2$. In the present embodiment, the thermal gradient lines lie on respective intermediate surface zones 63.

The number of thermal gradient lines corresponds to the product N·k, wherein N the number of conduits constituting the plurality of conduits and k the number of windings of each conduit of the plurality on the outer toric surface 31a. In the apparatus of FIG. 2, the number of thermal gradient lines is equal to 16.

Preferably, the temperature difference $\Delta T$ is comprised between 10° C. and 200° C., more preferably comprised between 50° C. and 200° C. In general, the higher the thermal gradient $\Delta T$ is, the higher the energy that can be extracted from the device, which is directly proportional to $\Delta T$. Although in many cases it is preferable to have a $\Delta T$ value as big as possible, this value depends on the particular field of application, for example automotive or metallurgical industry.

In one example, a toric vessel suitable for extracting energy from a temperature gradient $\Delta T$ equal to 50° C. has the following dimensions: internal volume equal to 1 liter; inner diameter=220 mm (corresponding to the diameter of the through opening); outer diameter=260 mm; height=80 mm.

The thermal gradient creates a concentration gradient in the magnetic particles of the ferrofluid flowing inside the vessel 30 near its wall 31. The ferrofluid flows around the solid torus in the toroidal direction 67 along a ring path passing through a plurality of zones at high temperature alternating with a plurality of zones at low temperature, that is through a plurality of thermal gradient lines.

Preferably, the diameter of the conduits is comprised between 1/5 and 1/10 of the maximum outer diameter of the vessel, that is taken along the toroidal line. For example, if the conduits have a diameter comprised between 1 mm and 100 mm, the maximum diameter of the vessel is comprised between 10 mm and 1000 mm. The maximum extension of the toroid outline in a plane that is an orthogonal projection of the toric volume including the toroidal direction (cartesian xy plane in FIG. 2) will be indicated as the diameter of the vessel. For simplicity's sake, reference to a diameter is made also in the case of an almost circular or elliptical outline along the toroidal direction, although in this case the maximum extension is properly represented by the major axis of the ellipse defined by the outline.

In some embodiments, the diameter of the conduits is comprised between 1 mm and 100 mm, in relation to the amount of thermal energy available for the specific application.

The conduits 36, 37, 38, 39 are made of a non-magnetic material, so as not to interfere with the magnetic field internal to the ferrofluid and, as described below and with the external magnetic field applied to the toric surface 31a. The material has preferably a high thermal conductivity to allow the transfer of heat between the conduits and the toric wall 31 of the vessel, preferably greater than 10 W/mK, more preferably greater than 20 W/mK, for example 30 W/mK.

Preferably, the hydraulic conduits are made of a material with low electrical conductivity, preferably lower than about 1 mS/cm, or electrically insulating. For example, the conduits 36-39 are flexible tubes made of a polymer matrix nanocomposite with carbon fiber.

The surface zones of the toric surface 31a in thermal contact with the conduit windings of the conduits 36, 37, 38, 39 containing the working fluid are at a temperature substantially corresponding to the temperature of the working fluid. On the outer toric surface 31a it is therefore possible to define a plurality of longitudinal segments transverse to the toroidal direction with a width (along the toroidal direction) substantially corresponding to the contact surface of the conduits, that is longitudinal surface zones for cooling or heating the ferrofluid contained in the vessel 30.

The distance laterally along the toroidal line between two near adjacent conduit windings of two distinct conduits is preferably comprised between 1 mm and 100 mm. This distance defines the width, in the toroidal direction 67, of the intermediate surface zones 63. Preferably, the lower limit of the lateral distance between two near adjacent windings of two distinct conduits is approximately equal to the diameter of the same conduits in order to avoid or reduce any exchanges of heat between the conduits and consequent thermal fluctuations of the ΔT value. The upper limit can be chosen based on possible construction needs.

By way of example, in the embodiment illustrated in FIG. 2 and in a particular operating configuration, the working fluid of the conduits 36 and 38 are at the first temperature $T_1$ ("cold" working fluid) and the working fluid of the conduits 37 and 39 is at the second temperature $T_2$ ("hot" working fluid).

The working fluid can be the same for each conduit 36, 37, 38, 39, for example a liquid fluid such as water, ethylene glycol mixed with water, or diathermic oil.

Preferably, the temperature of the working fluid in each conduit is obtained and/or maintained for a desired time through a heat exchange between the working fluid in each conduit 36, 37, 38, 39 and a service fluid at the temperature $T_1$ or $T_2$. In the embodiments illustrated herein and in an operating condition, each cooling or heating conduit 36-39 is connected to a thermal gradient generator assembly 35. FIG. 3 is a simplified schematic diagram, seen in a plane view, of an embodiment of a thermal gradient generator assembly 35 for selecting the temperature of the working fluid $T_1$ or $T_2$ circulating in the conduits 36, 37, 38 and 39 of the plurality of conduits shown in FIG. 2.

The thermal gradient generation assembly 35 comprises a first distribution conduit 42 a first and a second distribution conduit 42, 43 hydraulically connected to a respective source of service fluid at temperature $T_1$ ("cold") and $T_2$ ("hot") respectively, for example a respective tank. The cold source at temperature $T_1$ is not shown in FIG. 3, if not schematically with respective arrows, the flow 44 entering from the cold source at temperature $T_1$ to the first distribution conduit 42 and the flow 46 exiting from the same distribution conduit. Similarly, the hot source at temperature $T_2$ is not shown in FIG. 3, but the flow 45 entering from the cold source to the second distribution conduit 43 and the flow 46 exiting from the same distribution conduit are indicated with respective arrows.

Preferably the service fluid contained in the hot and cold sources is diathermic and can be the same fluid for both sources, for example water, which feed the hydraulic cooling and heating circuits, independent of each other. However, the present invention is not limited to the use of the same service fluid for cooling and heating. For example, the service fluid can be an exhaust gas of a combustion engine and ambient air, or yet the cooling liquid of a combustion engine and ambient air.

A portion of the first distribution conduit 42 passes through a first heat exchanger 48a for heat exchange between the service fluid at the temperature $T_1$ and the working fluid and a portion of the second distribution conduit 43 passes through a second heat exchanger 48b for the thermal exchange between the service fluid at the temperature at the temperature $T_2$ and the working fluid. For this purpose, a portion of each cooling/heating conduit 36, 37, 38, 39 passes through one of the two heat exchangers 48a, 48b so as to come into thermal contact with one of the service fluids distributed by the distribution conduits 42, 43 for cooling/heating or for maintaining the temperature of the working fluid at the first or second temperature.

Preferably, each conduit 36, 37, 38, 39 forms a respective hydraulic closed-looped cooling or heating circuit which comprises a first portion consisting of one or more windings around the toric wall 31 of the vessel and a second non-wound portion that is not in contact with the toric surface 31a and extends outside the vessel 30. In this embodiment, the non-wound portion comprises or consists of the portion affected by the heat exchange that passes through one of the two heat exchangers 48a, 48b. Each heat exchanger 48a, 48b respectively comprises a cooling conduit 49a and a heating conduit 49b. In the heat exchanger 48a, the cooling conduit 49a is in thermal contact with the first distribution conduit 42. Similarly, in the heat exchanger 48a, the cooling conduit 49a is in thermal contact with the second distribution conduit 43.

Figure 3A:
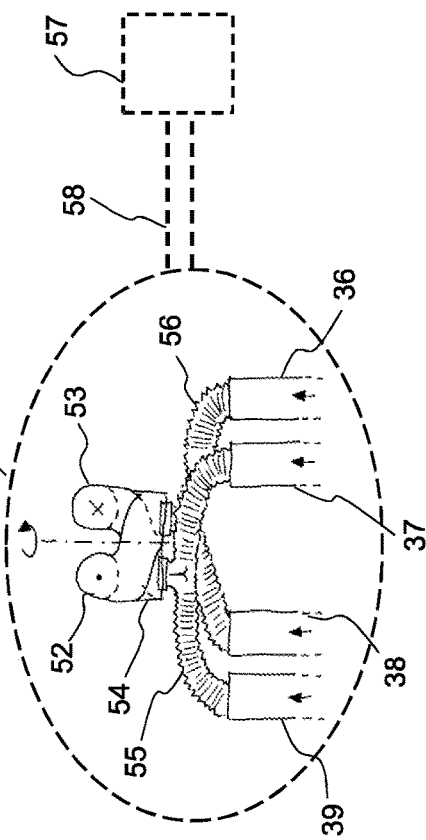
FIG. 3a is an enlargement of some details of the hydraulic circuit of FIG. 3, in a side view.

The non-wound portion of each of the heating/cooling conduits 36, 37, 38, 39 comprises or consists of the portion affected by the heat exchange, which may be in thermal contact selectively with the cooling conduit 42 or with the heating conduit 43. In the embodiment of FIG. 3, the temperature gradient generator assembly 35 comprises a first distributor 50 configured to receive the flow of the working fluid entering from the respective conduits 36-39, and a second distributor 51 configured for the outflow of the flow of the working fluid exiting from the respective conduits 36-39. The first and second distributors 50, 51 are in all respects similar. FIG. 3a is a partial enlargement of FIG. 3, indicated with a dashed oval 56 in FIG. 3, in a side view.

The first distributor 50 (or the second distributor 51) comprises a first collector conduit 52 fluidly connected to the first exchanger 48a at temperature $T_1$, in particular connected to a cooling conduit 49a, and a second collector conduit 53 fluidly connected to the second exchanger 48b a temperature $T_2$, in particular connected to the heating conduit 49b. A switching element 54 selectively connects each of the conduits 36-39 to the first or second collector conduit 52, 53, then to the first or second heat exchanger. In the embodiment illustrated in FIG. 3, the switching element 54 comprises a single rotating part, internally hollow able to connect two respective first and second converging connecting conduits 55 and 56, in the example, corrugated flexible tubes, alternatively to the collector conduits 52 or 53. The connecting conduits 55 and 56 are "Y"-shaped and connect from the other side the sub-plurality of odd conduits 36, 38 and to the sub-plurality of even conduits 37, 39, respectively. The rotating element 54 has only two switching positions: a first position which connects the first connecting conduit 55 to the first collector conduit 52 and the second connecting conduit 56 to the second collector conduit 53, and a second position connecting the first connecting conduit 55 to the second collector conduit 53 and the second connecting conduit 56 to the first collector conduit 52. Preferably, the rotating element 54 of the distributor 50 as well as the analogous rotating element of the distributor 51 (not shown in FIG. 3a) are servo-assisted by a respective actuator (for example an electric motor, not shown in the figure), electronically controlled by an electronic controller 57. The electronic controller is connected to the first and second actuators of the respective rotating elements to impart control signals to both for the simultaneous switching of both rotating elements between the first and second switching position. The electric control lines from/to the electronic controller are represented in FIG. 3a with dashed lines 58. The electronic controller 57 is configured to control the combinations of the distributors in such a way that the fluids flow correctly in the joined conduits 36 and 38, 37 and 39.

The heat exchangers 48a and 48b may have a construction per se known and the heat exchange can take place in various ways. The working fluid of the conduits 36 and 38 and of the conduits 37 and 39 that flows inside the heat exchanger exits cooled/heated or maintained at the service temperature $T_1$ or $T_2$. The hydraulic circuit which comprises or consists of each conduit (36, 37, 38 or 39) joined to the connecting tube (55 or 56), to the collector conduit (52 or 53) and to the cooling or heating conduit (49a or 49b) is a closed loop.

The portion of the closed circuit which comprises the respective conduit, which is affected by the heat exchange is schematically indicated in FIG. 3 with the squares 48a and 48b, where the conduits containing the working fluid are placed in thermal contact with the first distribution conduit 42 or the distribution conduit 43. In the embodiment of FIG. 3, the conduits 36 and 38 mix their fluids inside the first distributor 50 circulating in the cooling conduit 49a and are again sorted in the respective conduits 36, 38 inside the second distributor 51, while the conduits 37, 39, which are placed in thermal contact with the second distribution conduit 43, mix their fluids inside the first distributor 50, circulating in the heating conduit 49b and are sorted in the respective conduits 37, 39 inside the second distributor 51.

In an embodiment (not shown in the figure), the non-wound portion of the conduit of each conduit 36-39 comprises or consists of the portion affected by the heat exchange that passes through one of the two heat exchangers 48a, 48b. In this embodiment, the hydraulic circuit formed by each of the conduits 36-39 is a closed circuit.

In a different embodiment, the conduits of the plurality of conduits 36, 37, 38, 39 are connected alternatively to the first or second distribution conduit 42 and 43. In this embodiment, the service fluid that flows in the distribution conduits is the working fluid and the hydraulic circuits of the conduits 36, 37, 38 and 39 are open-loop.

Preferably, the thermal gradient generator assembly 35 is configured to control the temperature of each conduit of the plurality of conduits by varying over time the temperature of the working fluid flowing inside it between the first temperature and the second temperature and vice versa.

In some preferred embodiments, the device 35 is configured to cyclically vary the temperature of the working fluid of each conduit between the first and second temperature and vice versa.

Preferably, the temperature of the working fluid is changed between the two values $T_1$, $T_2$ simultaneously for each conduit of the plurality of conduits. In this way, the scalar value $\Delta T$ of the thermal gradient remains constant while the sign of the scalar value of each thermal gradient varies along the toroidal direction 67 followed in the same direction, i.e. clockwise or counterclockwise.

With reference to the embodiment of FIG. 3, the variation of the temperature of the working fluid of each conduit 36, 37, 38, 39 is controlled by the electronic controller 57 logically connected to the rotating elements 54 of the first and second distributor 50 and 51. The electronic controller 57 is configured to simultaneously control these rotating elements 54 so as to simultaneously vary their switching position and alternatively connect the conduits 36, 38 and 37, 39 to the cooling conduit 49a and to the heating conduit 49b of the respective heat exchangers 48a, 48b. In ways known per se, the electronic controller 57 comprises a processor for executing a software program for controlling the switching of the rotating elements 54 between the two positions and a memory for storing the software program.

For example, at an initial time to, the sub-plurality N/2 of even conduits is fluidly connected with the first source 44 of fluid at temperature $T_1$ while the sub-plurality N/2 of odd conduits is fluidly connected with the source 45 of fluid at temperature $T_2$. At a subsequent time $t_1$, the electronic controller 57 commands the simultaneous switching of the fluidic connection of the even conduits and the odd conduits with the other source at different temperature. An effect of the thermal variation on the inner surface of the toric wall and therefore on the ferrofluid may not be immediate and is generally produced after a certain time which depends on the thermal diffusion of the heat through the constituent elements of the device and the inversion of the distribution of the temperature zones. The amplitude of the time interval required for the advancement of the thermal distribution and the inversion of temperature that contributes to triggering the motion of the ferrofluid in the torus, $\Delta t$, generally depends on the total enthalpy available. A greater enthalpy is generally associated with a lower latency time (higher heat diffuses more rapidly through the walls of the container).

In the present context and according to some embodiments, it is meant by simultaneity in the electronic control of a switching of the connection with the fluid source at $T_1$ or $T_2$ of all of the heating/cooling conduits when it occurs in a time of the order of ms.

The energy available upstream for the conversion into electromotive force is evaluated, known the thermal capacity of the diathermic fluid, simply from the enthalpy jump between the cold and the hot tank, based therefore on the measurement of the temperatures $T_1$ and $T_2$, which may be carried out by means of thermocouples in contact with the fluid, in real time. The feedback on the switching times of the conduits 36, 37, 38 and 39 with respect to said temperatures may be made by assigning a linear transfer function which produces the advancement of the warm fronts with respect to the hydraulic circuits which comprise the conduits 36, 37, 38 and 39 by switching the fluid connection of all the conduits between the cold source and the hot source of fluid. The latency time may be for example comprised between $10^3$ s for $\Delta T$ of 1° C. at $10^{-1}$ s for $\Delta T$ of 200° C.

Electronic controllers that may linearly implement feedback timing based on a temperature differential reading are for example commercial processors such as FPLA (Fully Programmable Logic Array), PLC (Programmable Logic Controller) or microcontrollers such as Arduino.

With reference again to FIG. 2, on at least some of the plurality of intermediate regions 63 of the outer toric surface 31a of the vessel 30 an external magnetic field parallel to the thermal gradient vector, that is tangent to the outer toric surface by means of a magnetic field source, is applied. In the embodiment illustrated in the Figure, a uniform external magnetic field is generated by a plurality of permanent magnets 62 arranged on regions of the plurality of intermediate zones 63 of the outer surface 31a. Preferably, at least one permanent magnet 62, preferably a sub-plurality of magnets of the plurality of magnets, is arranged on each intermediate surface zone 63 between two near adjacent conduit windings. The magnets of each sub-plurality are preferably arranged in an array along a respective direction transverse to the toroidal direction of the vessel 30, preferably along a poloidal line 68. A plurality of arrays of permanent magnets is defined by a number corresponding to the number of sub-pluralities of magnets, the arrays of magnets being arranged on respective intermediate regions 63 of outer surface 31a along lines generically parallel to the thermal gradient lines.

The Applicant has understood that a parallelism between the magnetic field generated by the array of magnets and the thermal gradient lines represents a preferred "geometric" condition for starting the thermomagnetic advection. Preferably, the plurality of magnets 62 is subdivided into sub-plurality (arrays) of magnets, in which each array has at least 2 magnets. The arrays of magnets are preferably arranged on the surface in a direction transverse to the toroidal direction 67 and generally parallel to the transverse direction of the conduit windings. Therefore, in this embodiment, the arrays of magnets are arranged in parallel with the thermal gradient lines.

Each permanent magnet 62 has a main extension plane and creates a local magnetic field along a direction of magnetisation in the main extension plane of the magnet. The magnets 62 are mounted on the outer surface 31a so that the direction of magnetisation (hence the local magnetic field) is substantially parallel to the thermal gradient vector.

The permanent magnets 62 may be for example plate magnets mounted on the outer surface 31a of the vessel 30. Preferably, the thickness of each magnet is comprised between 1 mm and 25 mm, generally thin enough to adapt to the two-dimensional curvature of the toroid.

Preferably, the magnets 62 are made of a material which is able to maintain its magnetism even at relatively high temperatures, such as the relatively higher temperature $T_2$. An example of a suitable magnetic material is AlNiCo which has a working temperature range between 25° C. and 125° C.

The apparatus 20 further comprises an extraction coil 65 which comprises a plurality of turns of conductor wire wound on the outer surface 31a of the toric wall 31 of the vessel 30, the turns of the coil 65 being arranged at at least one sub-plurality of the plurality of intermediate surface zones 63. The turns of the plurality of turns of the extraction coil 65 extend along directions transverse to the toroidal direction of the vessel, preferably in a poloidal direction 68 generally parallel to the windings of the plurality of conduits 36, 37, 38 and 39.

Preferably, the plurality of turns 65' of the extraction coil 65 is arranged on each intermediate surface zone 63 of the outer surface 31a of the toric wall 31. Preferably, turns 65' of the coil 65 generally cover each free surface region. For reasons of clarity, in FIG. 2 the windings 65' of conductor wire are shown only on seven intermediate regions 63 adjacent one to another.

The time-varying magnetic field produced by the variation of the density gradient of the ferromagnetic nanoparticle aggregates induces an electromotive force in the extraction coil 65 which in turn generates an electric current which may be harvested at the ends 64 of the extraction coil 65. The ends 64 may be the free ends of the electrical conductor wire that is wound so as to form the turns 65'.

In ways known per se, the ends 64 may be connected to a supercapacitor, an electrochemical accumulator or of another nature, or to an electrical load that directly uses the available energy.

Without wishing to limit the invention to a particular theory, a main concept underlying the present disclosure is the stabilisation of the topological solitons known as "Hopfions" which, from the mathematical point of view, describe the density waves of the ferrofluid nanoparticles. Topological solitons are toric nodes that are wound p times around the toroidal coordinate i and q times around the poloidal coordinate j. The p and q coordinates are known as topological charges that represent the constants of motion and their product, c=pq, is known as the Hopf charge. A Hopfion can therefore describe the density waves that are produced inside the toroidal vessel, the density waves being caused by the distribution of the thermal gradients and by the distribution of the magnetic fields on the toric surface, when a ferrofluid is confined inside said surface.

With reference again to FIG. 1, a conceptual graphic representation of two coexisting Hopfions 24 and 25 with a Hopf charge equal to 3, p=1 and q=3 is given.

The number of Hopfions that are produced inside the toroidal vessel is equal to the total number of hydraulic circuits connected to the hot tank (for thermophilic systems) or to the total number of hydraulic circuits connected to the cold tank (for thermophobic systems). The number of coexistent Hopfions inside a device often depends on the size of the toric vessel. In particularly small vessels, this number could be equal to 1, while for vessels with high capacity for industrial devices it might increase up to 100. The topological charge, c, is preferably comprised between 1 and 10, in order not to make the distribution of the density waves inside the vessel too complex.

The sum of the Ludwig-Soret effects and the thermal advection ensures that the concentration of the magnetic nanoparticles within the carrier fluid is not homogeneous, but rather oscillates between high values and low values, at hot and cold points in relation to the thermophilia and thermophobicity. The temporal succession that leads each conductor to an alternation of cold/hot conditions does not destroy the density waves of nanoparticles, but simply translates the density waves making them rotate around the toroidal axis, producing the motion of the ferromagnetic fluid to be obtained for the conversion of electromagnetic energy.

Naturally, those skilled in the art may make further modifications and variants to the above-described invention with the purpose of meeting specific and contingent application needs, variants and modifications in any case falling within the scope of protection as defined by the successive claims.

The invention claimed is:

1. A thermomagnetic apparatus for electric power production, comprising:
   a hollow toric vessel delimited by a wall having an outer toric surface having a toroidal direction, wherein the toric wall encloses a volume containing a ferrofluid which comprises magnetic nanoparticles dispersed or suspended in a fluid carrier;
   a plurality of hydraulic conduits in thermal contact with the outer toric surface and arranged thereon along directions transverse to the toroidal direction, wherein near adjacent hydraulic conduits are spaced from each other in the toroidal direction so as to define on the outer toric surface a respective plurality of intermediate surface zones, each intermediate surface zone extending transversely to the toroidal direction;
a magnetic field source coupled to the outer toric surface to generate a magnetic flux thereon, and
an extraction coil which comprises a plurality of turns of electrical conductor wire arranged on the outer toric surface, the turns of the extraction coil being wound along directions transverse to the toroidal direction and arranged at at least a first sub-plurality of the plurality of intermediate surface zones.

2. According to claim 1, wherein the magnetic field source comprises a plurality of permanent magnets arranged on the outer toric surface at at least a second sub-plurality of intermediate surface zones.

3. Apparatus according to claim 2, wherein a sub-plurality of magnets of the plurality of magnets is arranged on each of the second sub-plurality of intermediate surface zones, each sub-plurality of magnets being arranged on the respective intermediate surface zone along a direction transverse to the toroidal direction and generally parallel to the transverse directions of arrangement of the hydraulic conduits.

4. Apparatus according to claim 2, wherein the second sub-plurality of intermediate surface zones corresponds to the first sub-plurality of intermediate surface zones on which the turns of the extraction coil are arranged.

5. Apparatus according to claim 1, wherein the magnetic field source is configured to create an external magnetic field having a direction tangent to the outer toric surface.

6. Apparatus according to claim 1, wherein the turns of the extraction coil are wound around the outer toric surface along transverse directions generally parallel to each other and to the transverse directions of arrangement of the hydraulic conduits.

7. Apparatus according to claim 1, wherein each conduit of the plurality of conduits is wound around the outer surface with at least one conduit winding extending along a respective direction transverse to the toroidal direction, and wherein the respective conduit windings of the plurality of conduits are arranged adjacent in an alternating fashion from one another so that near adjacent conduit windings are windings of two different conduits of the plurality of conduits.

8. Apparatus according to claim 7, wherein the transverse directions of the conduit windings are generally parallel to each other and the plurality of conduits consists of an even number N of hydraulic conduits formed by N/2 odd conduits and by N/2 even conduits, the conduit windings of the odd conduits and of the even conduits being arranged alternately with each other, wherein each of the N/2 odd conduits contains a working fluid at a relatively lower temperature and each of the N/2 even conduits contains a working fluid at a relatively higher temperature, creating on the outer surface along the toroidal direction a plurality of surface zones alternating between the relatively lower temperature, at the windings of the N/2 odd conduits, and the relatively higher temperature, at the windings of the N/2 even conduits, said zones alternating along the toroidal direction, so as to create a plurality of temperature gradients at the respective intermediate surface zones.

9. Apparatus according to claim 1, wherein each conduit of the plurality of conduits is wound around the outer surface with at least one conduit winding extending along a respective direction transverse to the toroidal direction, and wherein the respective conduit windings of the plurality of conduits are arranged adjacent in an alternating fashion from one another so that near adjacent conduit windings are windings of two different conduits of the plurality of conduits, the apparatus further comprising a thermal gradient generator assembly configured to control the temperature of a working fluid contained in each conduit of the plurality of conduits by varying cyclically over time the temperature of the working fluid of said conduit between the relatively higher temperature and the relatively lower temperature and vice versa.

10. Apparatus according to claim 9, wherein the thermal gradient generator assembly is configured to vary the temperature of the working fluid between a first temperature $T_1$ and a second temperature $T_2$, with $T_2 > T_1$, and vice versa, simultaneously for each conduit of the plurality of conduits so as to change over time the sign of the difference between the first and second temperatures between each pair of near adjacent conduit windings of the plurality of conduits.

11. Apparatus according to claim 9, wherein the plurality of conduits consists of an even number N of hydraulic conduits formed by N/2 odd conduits and by N/2 even conduits and wherein the thermal gradient generator comprises a first source of service fluid at a first temperature $T_1$ and a second source of service fluid at a second temperature $T_2$ and each conduit of the plurality of conduits comprises a first conduit portion consisting of one or more windings around the outer toric surface and a second non-wound conduit portion which is not in contact with the outer toric surface (31a) and extends externally from the vessel, the working fluid of the second conduit portion of each conduit of the N/2 odd conduits and the working fluid of the second conduit portion of each conduit of the N/2 even conduits being in thermal contact alternately with the service fluid at the first temperature $T_1$ or with the service fluid at the second temperature $T_2$ so as to achieve a heat exchange to maintain or to vary the temperature of the working fluid contained in the plurality of conduits.

12. Apparatus according to claim 1, wherein the hollow vessel has the shape of a toroid with a through opening and the directrix of the toroid defines the toroidal direction and wherein the plurality of hydraulic conduits are wound around the outer toric surface along transverse directions generally parallel to each other.

13. A method for harvesting electric power using thermomagnetic energy, comprising:
providing a hollow toric vessel delimited by a wall having an outer toric surface having a toroidal direction, wherein the toric wall encloses a volume containing a ferrofluid which comprises magnetic nanoparticles dispersed or suspended in a fluid carrier;
generating a plurality of temperature gradients along the toroidal direction creating a plurality of surface zones extending on the outer toric surface transversely to the toroidal direction and in an alternating fashion between a relatively higher temperature and a relatively lower temperature, so as to create a difference in temperature in each pair of near adjacent surface zones, each temperature gradient of the plurality of gradients being represented by a vector tangent to the outer toric surface of scalar value equal to the temperature difference;
generating a magnetic flux on the outer toric surface and having a vector direction tangent to the same surface, and
harvesting electric current from an extraction coil, the extraction coil comprising a plurality of turns of conductive electric wire, the turns being arranged on the outer toric surface.

14. Method according to claim 13, wherein generating a plurality of temperature gradients along the toroidal direction comprises:

placing the plurality of surface zones in thermal contact with respective heat transfer elements which are alternately at a relatively higher temperature and at a relatively lower temperature, the method further comprising controlling the temperature of each heat transfer element by cyclically varying over time the temperature of each heat transfer element between the relatively higher temperature and the relatively lower temperature so that at each temperature variation, the scalar value of the temperature gradient between near adjacent surface zones is reversed in sign.

* * * * *